United States Patent [19]

Roy

[11] 4,307,795
[45] Dec. 29, 1981

[54] CAM SHIFT MECHANISM

[75] Inventor: Richard H. Roy, Mt. Vernon, Ohio

[73] Assignee: The J. B. Foote Foundry Co., Fredericktown, Ohio

[21] Appl. No.: 128,450

[22] Filed: Mar. 10, 1980

[51] Int. Cl.³ .............................................. F16D 11/10
[52] U.S. Cl. ................. 192/67 R; 192/89 A; 192/93 A; 192/101
[58] Field of Search ................ 192/67 R, 89 A, 93 A, 192/101

[56] References Cited

U.S. PATENT DOCUMENTS

| | | | |
|---|---|---|---|
| 962,567 | 6/1910 | Hancock | 192/101 |
| 1,193,008 | 8/1916 | Fuller | 192/89 A X |
| 1,315,578 | 9/1919 | Rock | 192/89 A |
| 1,811,655 | 6/1931 | Smitmans | 192/89 A X |
| 1,868,343 | 7/1932 | Altorfer | 192/89 A |
| 2,260,770 | 10/1941 | Brownlee | 192/89 A |
| 4,117,652 | 10/1978 | Jones et al. | 192/67 R X |

Primary Examiner—Rodney H. Bonck
Attorney, Agent, or Firm—Allen D. Gutchess, Jr.

[57] ABSTRACT

Shift mechanism for a transmission is provided for engaging and disengaging a gear therein. The mechanism is particularly designed to disengage the gear when the transmission is under a heavy load. The mechanism includes a clutch dog or collar on a shaft, with the collar having at least one lug or tooth which is engagable with and disengagable from a lug or tooth on a gear rotatably carried on the shaft. The clutch collar has a peripheral flange with a cam configuration on the side toward the gear. A shifter fork has a projection or cam follower with a cam surface facing the cam surface of the flange. To disengage the clutch collar from the gear, the cam follower of the shifter fork is engaged with the cam surface of the clutch collar and forces it away from the gear to a disengaged position, even when the transmission is under a heavy load.

10 Claims, 4 Drawing Figures

CAM SHIFT MECHANISM

This invention relates to shift mechanism for shifting a clutch collar or the like into engagement with a gear or the like and for forcing the clutch collar out of engagement.

It is frequently difficult to disengage a clutch collar from a gear in a transmission of a riding lawn mower, a garden tractor, or even a self-propelled lawn mower. This can occur when the transmission is under a heavy load, such as when the mower is travelling uphill, particularly if it is a self-propelled rear bagger with the load on the rear, driven wheels, by way of example. This can result in a dangerous condition, if the mower cannot be stopped, or at least parts of the shift mechanism can be distorted, bent, or broken.

By forming the clutch lugs or teeth of the clutch collar of the transmission with their engagable surfaces at angles, about six degrees for example, the clutch collar and gear can be disengaged even when the transmission is under a heavy load. However, this angle causes the lugs to wear much faster and have severely shortened useful life.

The present invention provides a shift mechanism which causes the clutch collar to engage the gear in the usual manner and then physically forces the clutch collar out of engagement with the gear, when disengagement is desired. The shift mechanism includes the clutch collar or dog which is mounted on a shaft of the transmission for rotatable movement therewith and for lineal movement with respect thereto. The clutch collar has at least one lug or tooth extending toward the gear in the transmission, which gear is rotatably mounted on the shaft and has at least one lug or tooth facing toward the clutch collar. The clutch collar has a peripheral flange extending radially outwardly beyond the clutch collar lug. The side of the flange facing toward the gear has a cam surface with at least one thick cam portion or lobe and at least one thin cam portion. The opposite side of the flange has a planar peripheral surface.

A shifter fork has a flange with a planar surface engagable with the planar peripheral surface of the clutch collar flange to move the clutch collar from a disengaged position in which the lugs are spaced apart to an engaged position in which the lugs are in contact, to cause the gear to rotate with the shaft through the collar. The shifter fork also has a projection or cam follower spaced from the shifter fork flange by a distance exceeding the thickness of the thick cam portion of the clutch collar flange. This projection preferably has a convex cam surface engageable with the cam surface of the clutch collar to force the clutch collar from the engaged position to the disengaged position when moved into engagement with the clutch collar flange. The transmission can then be disengaged even if under a heavy load.

It is, therefore, a principal object of the invention to provide improved shift mechanism for a small transmission or the like.

Another object of the invention is to provide shift mechanism for a transmission for disengaging a clutch collar from a gear even when the transmission is under a heavy load.

A further object of the invention is to provide shift mechanism in which a clutch collar is disengaged from a gear by a camming action.

Yet another object of the invention is to provide shift mechanism including a clutch collar with a peripheral flange having a cam configuration on one surface and a shifter fork having a cam follower engageable with the cam surface of the collar.

Many other objects and advantages of the invention will be apparent from the following detailed description of a preferred embodiment thereof, reference being made to the accompanying drawings, in which.

Figure 1:
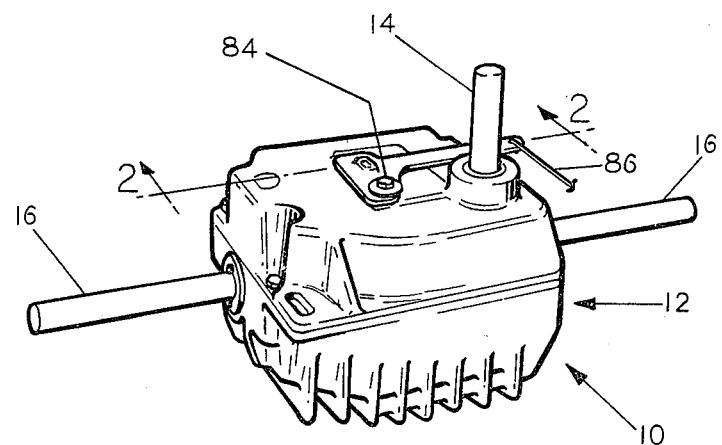
FIG. 1 is a view in perspective of a small transmission embodying shift mechanism according to the invention.

Referring to the drawings, and particularly to FIG. 1, a small transmission embodying the invention is indicated at 10 and can be mounted on a deck of a self-propelled, walking lawn mower, for example. With the transmission positioned as in FIG. 1, the mower would be moving from the lower right toward the upper left. The transmission includes a main housing 12 with a vertical input shaft 14 extending upwardly therefrom to receive a drive pulley or the like. A drive shaft 16 extends outwardly from both sides of the housing 12, with the left end being suitably connected to a left rear wheel of the mower and the right end being suitably connected to a right rear wheel of the mower. The basic transmission can be of the type shown in Jones et al U.S. Pat. No. 4,117,652, issued on Oct. 3, 1978.

A drive worm (not shown) is affixed to the input shaft 14 within the housing 12 and meshes with a worm wheel or gear 18 which is rotatably mounted on the output shaft 16. The shaft 16 is rotatably supported in bushings 20 and 22 having seals 24 and 26. The shaft is prevented from longitudinal movement by pins 28 and 30 on either side of the bushing 20 and bearing against washers 32 and 34.

The worm gear 18 has a recess 36 at one end to receive the seal 26 and one end of the bushing 22. The opposite end of the worm gear has a circular end face 38 cooperating with an upwardly-extending flange 40 of the housing 12, which is made in two halves. The worm gear thereby is restrained from longitudinal movement on the shaft 16 but is free to rotate relative thereto. The gear has a plurality, four in this instance, lugs or teeth 42 extending axially off the shaft 16.

A clutch collar or dog 44 is mounted on the output shaft 16 for longitudinal but nonrotatable movement with respect thereto. The collar 44 has a bore 46 with a groove 48 receiving a key 50 which extends outwardly from a recess 52 in the shaft 16. The collar 44 has a central hub 54 with a plurality, four, in this instance, lugs or projections 56 extending radially outwardly from the bore 46 and extending axially of the shaft 16 toward the worm gear 18 from the face of the hub 54. These lugs 56 are engagable with and disengagable from the lugs 42 of the worm gear 18. When the collar 44 is in an engaged position and the lugs are engaged, the clutch collar 44 causes the worm gear 18 to rotate with the shaft 16 through the collar. When the lugs 56 are spaced from the lugs 42 and the collar 44 is in a disengaged position, the worm gear is again free to rotate relative to the shaft 16.

The clutch collar 44 has an annular, peripheral flange 58 extending outwardly beyond the lugs 56. The flange has a planar surface 59 on the side thereof facing away from the worm gear 18 and an undulating or cam surface 60 on the side facing toward the worm gear. The cam surface 60 has at least one thick cam portion or lobe 62 and at least one thin cam portion 64, four of the thick portions 62 and four of the thin portions 64 being shown. Preferably, there are a sufficient number to enable the clutch collar 44 to be disengaged when the engine is stopped. The difference in thickness of the thick and thin cam portions of the clutch collar flange preferably exceeds the depth of the clutch lug.

The clutch collar 44 is moved between the disengaged and engaged positions by a shifter fork 66. The shifter fork has an upper, generally rectangular block 68 located in an upper portion of the housing 12 and supported on a divider plate 70 suitably mounted in an upper portion of the housing. The shifter fork has a downwardly extending flange 72 with an arcuate edge, the flange having a planar surface facing toward the worm gear 18 and engagable with the planar surface 59 of the flange 58 of the clutch collar 44. The shifter fork also has a downwardly extending projection or cam follower 74 spaced from the flange 72 toward the worm gear 18 with the projection 74 having a convex curved cam surface 76 facing toward the cam surface 60 of the clutch collar 44. The cam surface 76 is spaced from the planar surface of the flange 72 by a distance which exceeds the thickest portion of the cam lobe 62 of the cam surface 60.

When the shifter fork 66 is moved toward the worm gear 18, the flange 72 engages the planar surface 59 of the collar flange 58 and moves the collar toward the worm gear with the collar lugs 56 engaging the gear lugs 42. When the shifter fork 66 is moved away from the worm gear 18, the cam surface 76 of the projection 74 engages the cam surface 60 of the clutch collar 44 and forces the collar away from the worm gear, disengaging the collar lugs 56 from the worm gear lugs 42. This occurs even if the transmission is under a heavy load at the time of the desired disengagement, due to the interaction of the cam surfaces.

Figure 3:
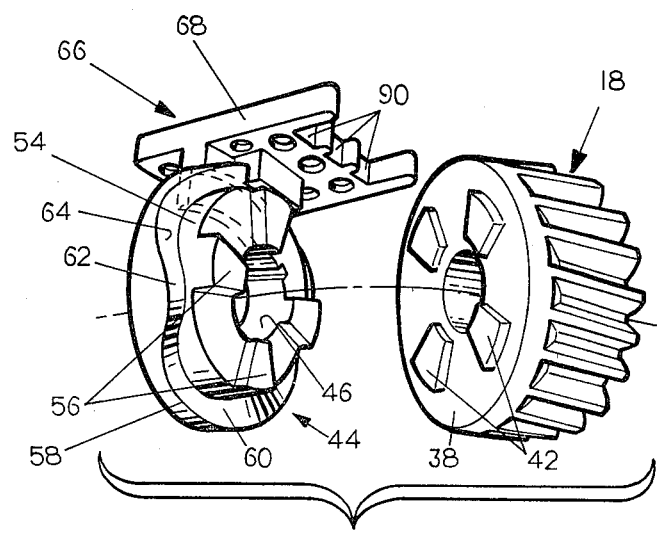
FIG. 3 is a view in perspective of a shifter fork, clutch collar, and a gear in accordance with the invention.
Figure 2:
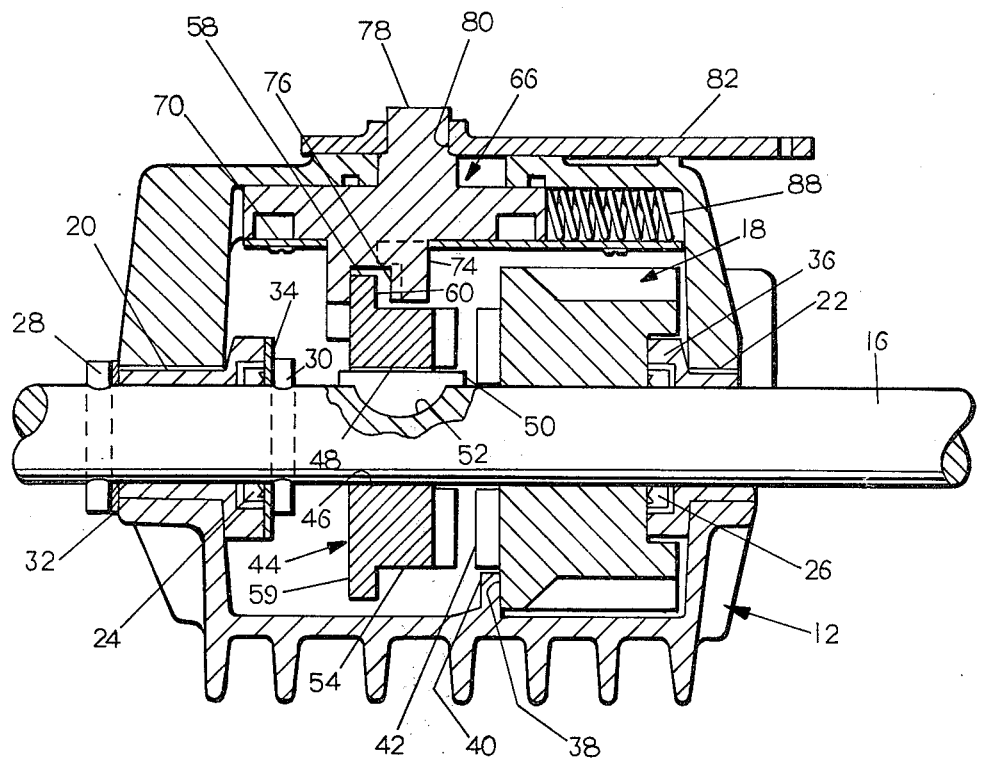
FIG. 2 is a view in longitudinal, vertical cross section, taken along the line 2—2 of FIG. 1.
Figure 4:
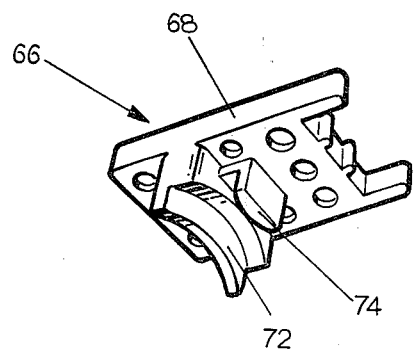
FIG. 4 is a view in perspective of the shifter fork of FIG. 3.

The shifter fork 66 can be moved between the two positions by any suitable means. As shown, the shifter fork has a post 78 extending upwardly through the housing and through a slot 80 in a shift lever 82. The shift lever 82 has a portion spaced from the slot 80 which is pivotally mounted on the housing 12 by a suitable fastener 84 (FIG. 1). The shifter fork 66 is moved toward the worm gear when the shift lever 82 is pivoted through a bowden cable 86 connected to the shift lever and extending to a control lever mounted on the operator's handle of the mower. The shifter fork 66 is urged in the opposite direction by coil springs 88 (FIG. 2) located in the upper portion of the housing, with ends received in notches 90 (FIG. 3) in the shifter fork block 68. From one to three of the springs 88 can be employed, with two, in the outer two notches 90, being preferred.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Shift mechanism for connecting a rotatable member with a shaft, said mechanism comprising a clutch collar mounted on the shaft for rotatable movement therewith and for lineal movement with respect thereto, said clutch collar having at least one lug extending toward the rotatable member and engagable with a lug on the rotatable member when said clutch collar is in an engaged position and spaced from the lug of the rotatable member when said clutch collar is in a disengaged position, said clutch collar having a flange extending radially outwardly beyond the clutch collar lug, said flange having a cam surface on the side toward the rotatable member with at least one thick cam portion and at least one thin cam portion, said flange having a planar peripheral surface on the other side, a shifter fork having a flange with a planar surface engagable with the planar peripheral surface of said clutch collar flange to move said clutch collar from the disengaged position to the engaged position, said shifter fork having a projection spaced from said shifter fork flange and having a convex cam surface facing toward said shifter fork flange, said convex cam surface being spaced from said shifter fork flange a distance exceeding the thickness of the thick cam portion of said clutch collar flange, and said convex cam surface being engagable with the cam surface of said clutch collar flange to force said clutch collar from the engaged position to the disengaged position.

2. Shift mechanism according to claim 1 characterized by the difference in thickness of the thick and thin cam portions of said clutch collar flange exceeding the depth of the clutch lug.

3. Shift mechanism according to claim 1 characterized by a housing, and means carried by said housing and engaging said shifter fork for moving said shifter fork in a direction parallel to the shaft.

4. Shift mechanism for connecting a rotatable member with a shaft, said mechanism comprising a clutch collar mounted on the shaft for rotatable movement therewith and for lineal movement with respect thereto, said clutch collar having a peripheral flange with an undulating surface on the side toward the rotatable member and with the flange having at least one thick portion and at least one thin portion, said clutch collar having at least one lug extending toward the rotatable member and engagable with a lug on the rotatable member when said clutch collar is in an engaged position and spaced from the lug of the rotatable member when said clutch collar is in a disengaged position, a shifter fork having a flange engagable with a surface of said clutch collar flange on the side opposite said undulating surface of said flange to move said clutch collar from the disengaged position to the engaged position, said shifter fork having a projection spaced from said shifter fork flange and engagable with said undulating surface of said clutch collar flange to force said clutch collar from the engaged position to the disengaged position.

5. Shift mechanism according to claim 4 characterized by said peripheral flange having at least four of said thick portions and at least four of said thin portions.

6. Shift mechanism according to claim 4 characterized by said shifter fork projection having a convex configuration on the surface facing said undulating surface.

7. Shift mechanism according to claim 4 characterized by said surface of said collar flange opposite said undulating surface being planar.

8. Shift mechanism according to claim 7 characterized by said shifter fork flange having an arcuate edge with the surface adjacent said edge being planar.

9. Shift mechanism according to claim 5 characterized by there being four of said collar lugs and four of said rotatable member lugs.

10. Shift mechanism according to claim 4 characterized by said rotatable member being a gear.

* * * * *